United States Patent
Beauchesne-Martel et al.

(10) Patent No.: US 11,236,681 B2
(45) Date of Patent: Feb. 1, 2022

(54) SYSTEMS AND METHODS FOR OPERATING GAS TURBINE ENGINES

(71) Applicant: PRATT & WHITNEY CANADA CORP., Longueuil (CA)

(72) Inventors: Philippe Beauchesne-Martel, Brossard (CA); Keith Morgan, Westmount (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 119 days.

(21) Appl. No.: 16/665,520

(22) Filed: Oct. 28, 2019

(65) Prior Publication Data

US 2021/0087978 A1 Mar. 25, 2021

Related U.S. Application Data

(60) Provisional application No. 62/905,522, filed on Sep. 25, 2019.

(51) Int. Cl.
| | |
|---|---|
| *F02C 9/20* | (2006.01) |
| *F02C 9/28* | (2006.01) |
| *F02C 9/54* | (2006.01) |
| F02C 9/46 | (2006.01) |
| F01D 17/06 | (2006.01) |
| F04D 27/02 | (2006.01) |

(52) U.S. Cl.
CPC .............. *F02C 9/20* (2013.01); *F02C 9/28* (2013.01); *F02C 9/54* (2013.01); *F01D 17/06* (2013.01); *F02C 9/46* (2013.01); *F04D 27/0246* (2013.01); *F05B 2260/80* (2013.01)

(58) Field of Classification Search
CPC ...... F02C 9/46; F02C 9/54; F02C 9/20; F01D 17/06
See application file for complete search history.

(56) References Cited

U.S. PATENT DOCUMENTS

| | | |
|---|---|---|
| 9,341,076 B2 | 5/2016 | Rowe et al. |
| 2012/0079832 A1* | 4/2012 | Benitah ................ F01D 21/003 60/802 |
| 2012/0317955 A1* | 12/2012 | Rowe ...................... F01D 21/06 60/39.01 |
| 2017/0205312 A1* | 7/2017 | Heyerman ................ G01L 5/00 |
| 2019/0032511 A1 | 1/2019 | Lueck |

* cited by examiner

*Primary Examiner* — Katheryn A Malatek
(74) *Attorney, Agent, or Firm* — Norton Rose Fulbright Canada LLP

(57) ABSTRACT

Methods and systems for operating a gas turbine engine having variable geometry mechanisms are described. The method comprises detecting a failure event associated with the gas turbine engine, identifying a location of the failure event, selecting an aerodynamic load modulation schedule for the variable geometry mechanisms of the gas turbine engine as a function of the location of the failure event, and applying the aerodynamic load modulation schedule as selected to the variable geometry mechanisms during the failure event.

18 Claims, 5 Drawing Sheets

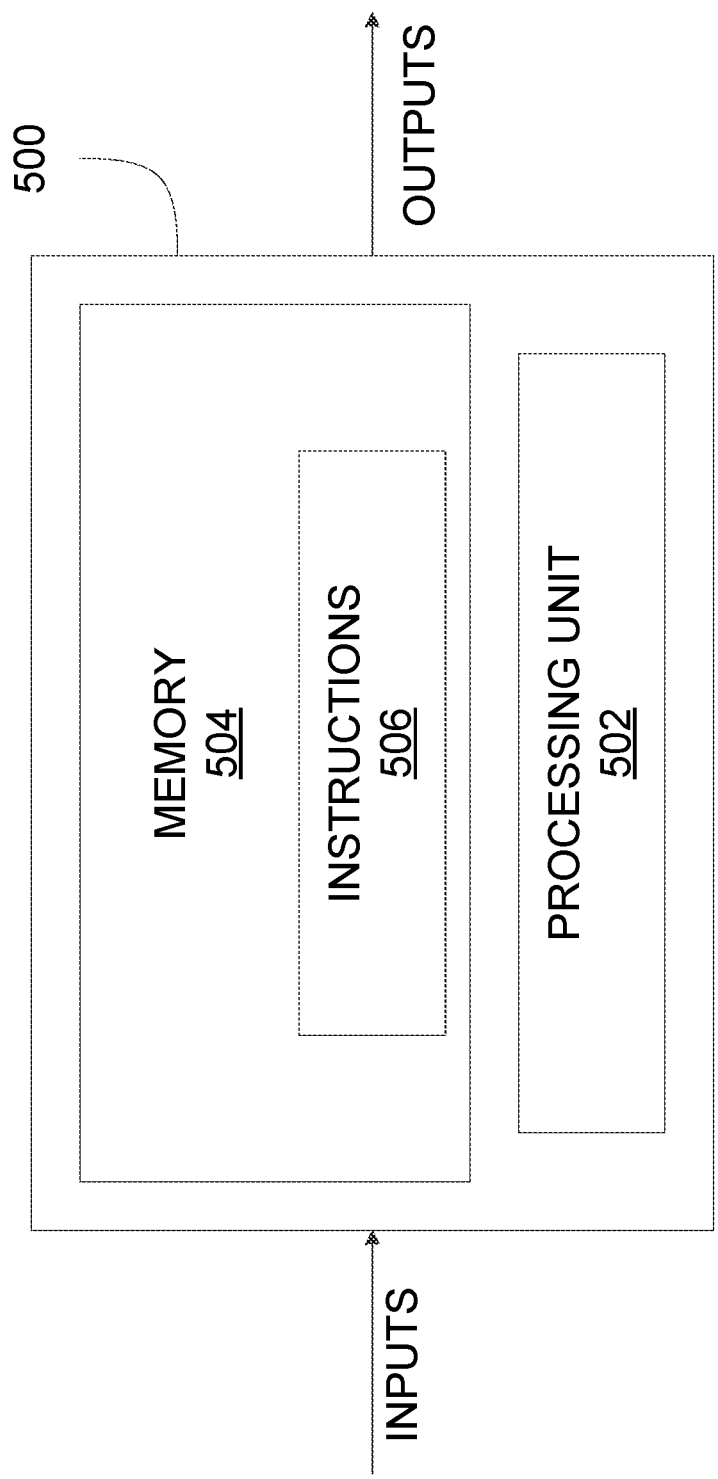

SYSTEMS AND METHODS FOR OPERATING GAS TURBINE ENGINES

CROSS-REFERENCE TO RELATED APPLICATIONS

The present application claims the benefit of U.S. Provisional Patent Application No. 62/905,522 filed on Sep. 25, 2019, the contents of which are hereby incorporated by reference.

TECHNICAL FIELD

The present disclosure relates generally to gas turbine engines, and more particularly to operating gas turbine engines in case of failure events.

BACKGROUND OF THE ART

Gas turbine engines comprise many rotating components, such as disks and blades of compressors and turbines. During failure events, the rotating components may attain speeds beyond regular operating speeds, i.e. overspeeds. In order to account for overspeeds, certain components are designed to be heavier or of more durable material than what is needed for regular operation, thus leading to increased costs and weight.

Therefore, improvements are needed.

SUMMARY

In accordance with a broad aspect, there is provided a method for operating a gas turbine engine having variable geometry mechanisms. The method comprises detecting a failure event associated with the gas turbine engine, identifying a location of the failure event, selecting an aerodynamic load modulation schedule for the variable geometry mechanisms of the gas turbine engine as a function of the location of the failure event, and applying the aerodynamic load modulation schedule as selected to the variable geometry mechanisms during the failure event.

In accordance with another broad aspect, there is provided a system for operating a gas turbine engine having variable geometry mechanisms. The system comprises a processing unit and a non-transitory computer-readable medium having stored thereon program instructions. The program instructions are executable by the processing unit for detecting a failure event associated with the gas turbine engine, identifying a location of the failure event, selecting an aerodynamic load modulation schedule for the variable geometry mechanisms of the gas turbine engine as a function of the location of the failure event, and applying the aerodynamic load modulation schedule as selected to the variable geometry mechanisms during the failure event.

In accordance with yet another broad aspect, there is provided a system comprising a gas turbine engine having variable geometry mechanisms and a control system operatively connected to the gas turbine engine. The control system is configured for detecting a failure event associated with the gas turbine engine and applying an aerodynamic load modulation schedule to the variable geometry mechanisms during a failure event as a function of a location of the failure event.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 5 is block diagram of an example computing device.

It will be noted that throughout the appended drawings, like features are identified by like reference numerals.

DETAILED DESCRIPTION

Figure 1:
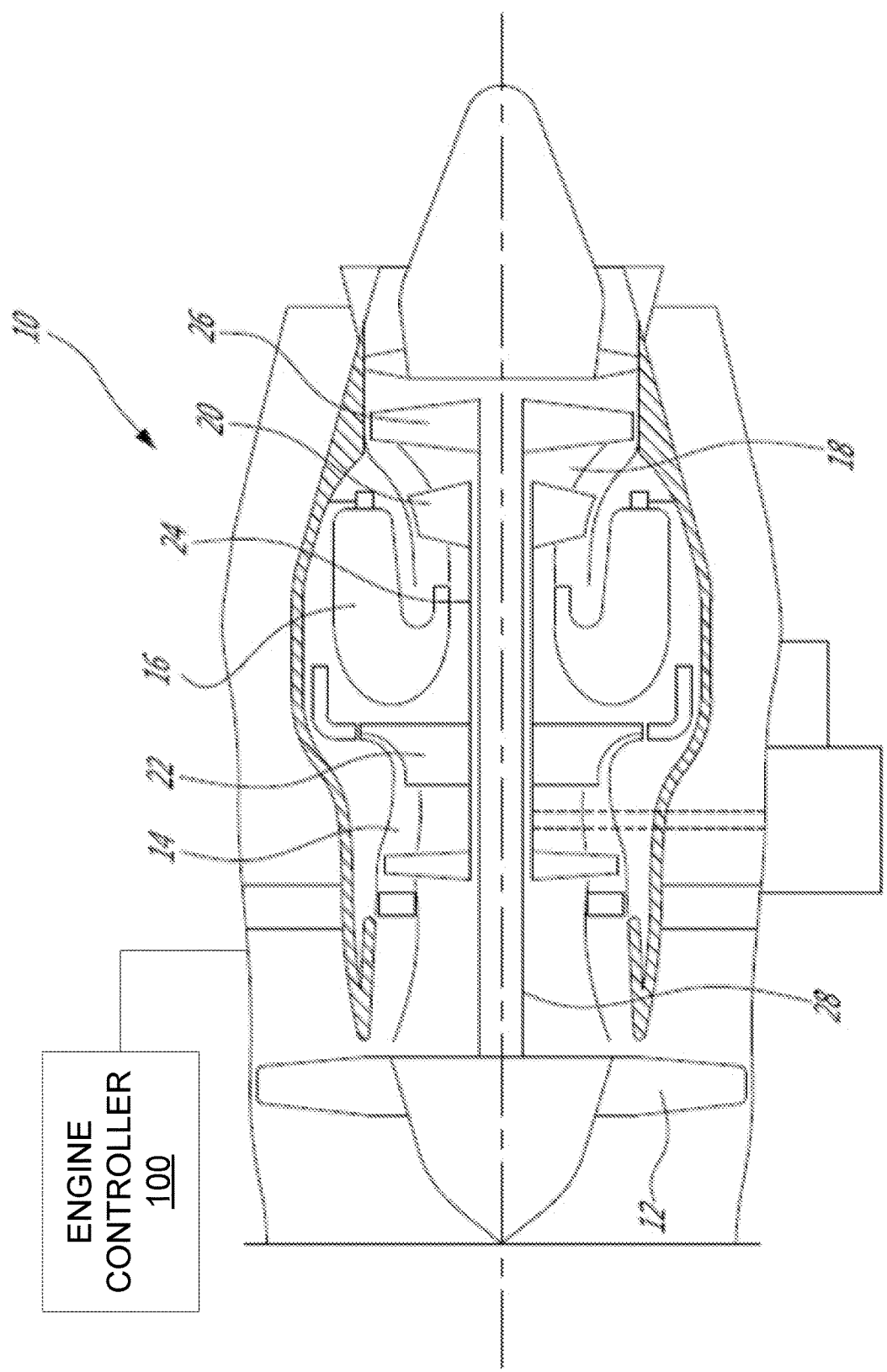
FIG. 1 is a schematic cross-sectional view of an example gas turbine engine.

FIG. 1 illustrates a gas turbine engine 10 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to low pressure rotor(s) 30 of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and an output shaft through which power is transferred. A turboprop engine may also apply. In addition, although the engine 10 is described herein for flight applications, it should be understood that other uses, such as industrial or the like, may apply.

In some embodiments, the engine 10 includes one or more variable geometry mechanisms (VGMs) which may assist in guiding airflow through the engine 10. In some embodiments, the VGMs consist of one or more variable guide vanes (VGVs), which may be one of inlet compressor guide vanes for directing air into the compressor section 14, outlet guide vanes for directing air out of the compressor section 14, variable stator vanes for directing incoming air into rotor blades of the engine 10, and/or one or more of variable nozzles, variable bleed-off valves, and the like. One or more of the above-mentioned VGMs may be adjusted for the purpose of reducing a maximum overspeed of rotating components of the engine during failure events. Indeed, adjustment of the position (e.g. the angle) of the VGMs can impact the inlet mass flow to the engine 10, and in turn slow down rotation of various components, such as disks and blades of compressors and turbines.

Control of the operation of the engine 10 can be effected by one or more control systems, for example an engine controller 100. The engine controller 100 can modulate a fuel flow rate provided to the engine 10 via a fuel control unit, the position and/or orientation of variable geometry mechanisms within the engine 10, a bleed level of the engine 10, and the like.

Figure 2:
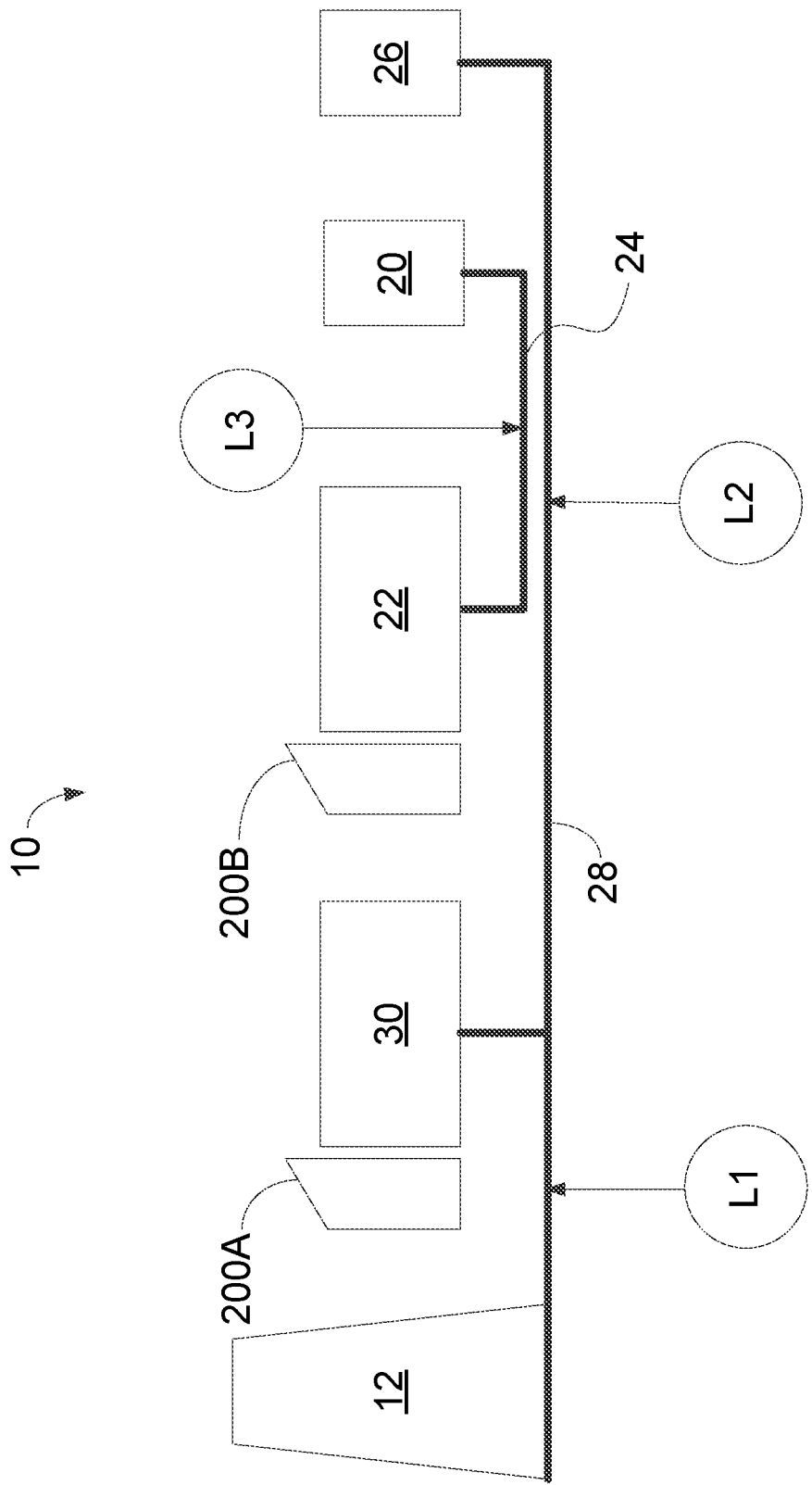
FIG. 2 is a block diagram side-view of the gas turbine engine of FIG. 1.

Referring to FIG. 2, the compressor section 14 is shown to be of the "split" type, and each one of the low pressure rotors 30 and the high pressure rotors 22 have VGMs 200a, 200b at their respective entries (when considering the direction of airflow coming in through rotor 12). In accordance with some embodiments, the VGMs 200a, 200b or a subset thereof, are modulated in response to detection of a failure event associated with the engine 10. In some instances, the VGMs are opened in order to generate a sudden increase in work to the compressor, thus acting like a brake (when the fuel flow stays constant or is reduced) and causing a reduction in the acceleration rate of the corresponding turbine. In some instances, the VGMs are closed in order to cut-off the air flow and slow down the turbine. In some instances, some VGMs are opened while other VGMs are closed. The VGMs are modulated as a function of a location of the failure.

Figure 3:
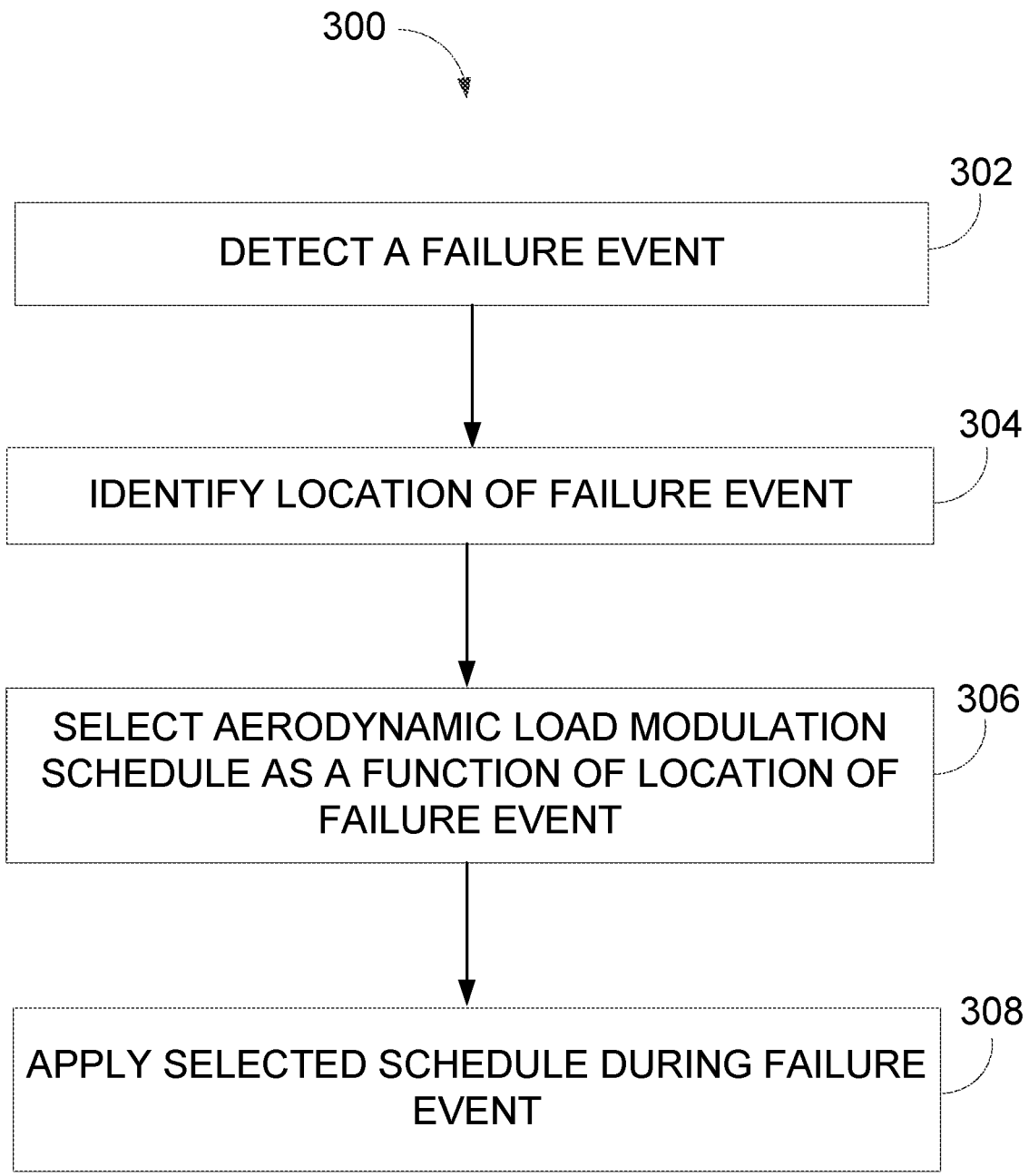
FIG. 3 is a flow chart of an example method for operating a gas turbine engine.

With reference to FIG. 3, there is illustrated an example method 300 for operating a gas turbine engine, such as engine 10. At step 302, a failure event is detected. Detection may occur using various techniques. In some embodiments, the failure event is a shaft shear event, for example along high pressure shaft 24 or low pressure shaft 28 of the engine 10, and one or more shaft shear detection methods are used. For example, a probe or sensor positioned adjacent to an end of the shaft may detect a mechanical axial displacement of the shaft when the shaft breaks; an axial accelerometer may be used to detect the axial movement of the shaft; the engine controller 100 may calculate a rate of change of shaft speed; the engine controller 100 may detect an oscillation signature of the shaft resulting from its sudden unloading after a shaft shear. Other shaft shear detection methods may also apply.

In some embodiments, the failure event is a fuel control unit (FCU) failure. The FCU acts as an intermediary between aircraft controls, such as a power lever, and a fuel valve. The FCU determines the amount of fuel needed for the engine to deliver the power requested by an operator. Too much fuel can damage the turbines due to excessive heat or cause a compressor stall. Too little fuel may cause the flame in the combustion chamber to extinguish. The FCU may take various forms, such as hydromechanical, electro-hydromechanical (via an electronic engine control (EEC)), and electrical (via a full-autority digital engine control (FADEC)). The technique used to detect a failure event associated with the FCU may vary as a function of the type of fuel control unit. Any known or other FCU failure detection technique may be used.

At step 304, the location of the failure event is identified. In some embodiments, identifying the location of the failure event comprises distinguishing between a shaft shear failure and an FCU failure.

In some embodiments, identifying the location of the failure event comprises determining which one of a plurality of shafts forming part of the engine incurred the failure event. For example and with reference to FIG. 2, a distinction may be made between a shaft shear on low pressure shaft 28 and a shaft shear on high pressure shaft 24.

In some embodiments, identifying the location of the failure event comprises determining a position of the failure event along a given shaft. The shaft may be separated into two or more segments, with each segment corresponding to a given location of a failure event. For example, a first segment may be composed of the portion of the low pressure shaft 28 between the rotor 12 and the low pressure rotor(s) 30 of the compressor. A failure event anywhere along this first segment of the shaft, including any features maintaining the rotor 12 and the low pressure rotor(s) 30 of the compressor engaged together (i.e. splines, shafts, gears, bolts, welds, and the like) may be identified as having occurred at a first location (L1). A second segment may be composed of the portion of the low pressure shaft 28 between the low pressure rotor(s) 30 of the compressor and the low pressure rotor(s) 26 of the turbine. A failure event anywhere along this second segment of the shaft 28, including any features maintaining the low pressure rotor(s) 30 of the compressor and the low pressure rotor(s) 26 of the turbine engaged together (i.e. splines, shafts, gears, bolts, welds, and the like) may be identified as having occurred at a second location (L2).

In some embodiments, an entire shaft, such as high pressure shaft 24, is considered as a given location. For example, a failure event anywhere along shaft 24, including any features maintaining high pressure rotor(s) 20 of the turbine to high pressure rotor(s) 22 of the compressor (i.e. splines, shafts, gears, bolts, welds, and the like) may be identified as having occurred at a third location (L3).

More or less predetermined locations may be used, depending on a configuration of the engine and practical implementations of the method 300.

Referring back to FIG. 3, at step 306 an aerodynamic load modulation schedule is selected as a function of the location of the failure event. At step 308, the selected schedule is applied to the VGMs, during the failure event.

The aerodynamic load schedule comprises one or more set of instructions designed to position the targeted VGMs to be open or closed. The engine controller 100 may be configured to apply the aerodynamic load schedule in accordance with the set of instructions. For example, the set of instructions may comprise a series of step changes to rotate the VGMs about an axis by a given angular displacement. The step changes may be of a same step size or may be composed of one or more step sizes. In some embodiments, the set of instructions comprise one large step to the fully open or fully closed position to each VGM.

Figure 4:
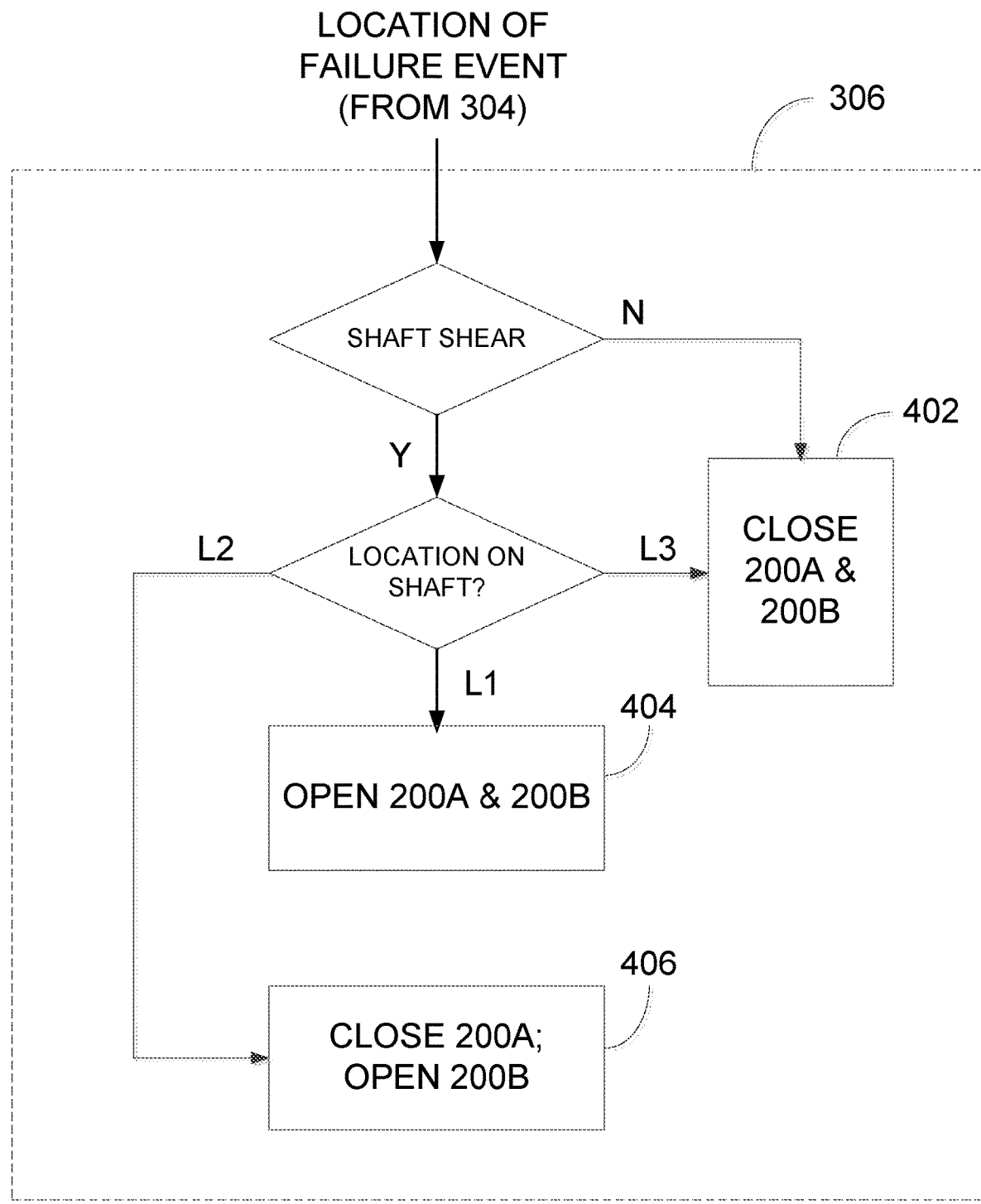
FIG. 4 is a flowchart of an example embodiment for selecting an aerodynamic load schedule.

FIG. 4 illustrates a specific and non-limiting example for step 306 of selecting an aerodynamic load modulation schedule as a function of the location of the failure event, based on the engine configuration shown in FIG. 2. Opening VGMs 200a will slow down the low pressure rotors 30 of the compressor and the low pressure rotors 26 of the turbine. Opening VGMs 200b will slow down the high pressure rotors 22 of the compressor and the high pressure rotors 20 of the turbine. Closing VGMs 200a will cut-off air flow through the engine 10 to further slow down the high pressure rotors 22 of the compressor and the high pressure rotors 20 of the turbine. Closing VGMs 200b will increase the temperature around the high pressure rotors 20 of the turbine, thus leading to a melting of the blades.

At step 304, the location of the failure event has been identified. If the failure event is not a shaft shear (and therefore is an FCU failure), an aerodynamic load schedule is selected to close the VGMs 200a at the inlet of the low pressure rotor(s) 30 of the compressor and to close the VGMs 200b at the inlet of the high pressure rotor(s) 22 of the compressor, as per step 402. This serves to cut-off the air flow through the engine 10. Without air, less power is available, and thus less acceleration capability for the engine 10. The reduction in air also causes the proportion of fuel to air in the engine 10 to increase, which increases the temperature, particularly in the area of the high pressure rotor(s) 20 of the turbine section 18. The increased temperature can cause the blades of the rotor(s) 20 to melt, which is a desired effect in order to slow down rotation of the components of the engine 10.

If the failure event is a shaft shear, its location on the one or more shafts is further determined. A shaft shear at L3 leads to a same action as an FCU failure, namely selecting an aerodynamic load schedule to close the VGMs 200a and 200b, as per step 402.

If the shaft shear is at location L1, the aerodynamic load schedule is selected to open the VGMs 200a and 200b, as per step 404. Opening VGMs 200a will increase the air flow through the compressor, causing a sudden increase in work for the low pressure rotors 30 of the compressor, which acts like a brake to reduce the acceleration rate of the low pressure rotors 26 of the turbine. Opening VGMs 200b also increases the amount of work for the high pressure rotors 22 of the compressor and causes a pressure drop through the high pressure rotors 20 of the turbine, making less power available for the low pressure rotors 26 of the turbine, which in turn also results in a further decrease in the acceleration rate of the low pressure rotors 26 of the turbine.

If the shaft shear is at location L2, the aerodynamic load schedule is selected to close VGMs 200a and open VGMs 200b, as per step 406. Closing the VGMs 200a reduces the overall gas path pressure, while opening the VGMs 200b increases the work done by the high pressure rotors 22 of the compressor and reduces the available power/pressure across the low pressure rotors 26 of the turbine, reducing its acceleration rate.

In some embodiments, the above-described aerodynamic load schedules are applied while maintaining fuel flow to the engine constant. Alternatively, fuel flow may be reduced concurrently with the application of the proper aerodynamic load schedule selected as a function of a location of the failure event location, so as to assist in slowing down the rotating components of the engine 10.

FIG. 5 is an example embodiment of a computing device 500 for implementing parts or all of the method 300 described above. The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method 300 described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 602.

It should be noted that the computing device 500 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 500 substantially in real-time.

The methods and systems for operating a gas turbine engine as described herein may be implemented in a high level procedural or object oriented programming or scripting language, or a combination thereof, to communicate with or assist in the operation of a computer system, for example the computing device 500. Alternatively, the methods and systems for operating a gas turbine engine may be implemented in assembly or machine language. The language may be a compiled or interpreted language. Program code for implementing the methods and systems for operating a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating a gas turbine engine may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for operating a gas turbine engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a gas turbine engine having variable geometry mechanisms, the method comprising:
   detecting a failure event associated with the gas turbine engine;
   identifying a location of the failure event from one of a shaft shear location and a fuel control unit location;
   selecting an aerodynamic load modulation schedule for the variable geometry mechanisms of the gas turbine engine from a plurality of aerodynamic load modulation schedules as a function of the location of the failure event; and
   applying the aerodynamic load modulation schedule as selected to the variable geometry mechanisms during the failure event.

2. The method of claim 1, wherein selecting the shaft shear location comprises selecting one of a first location, a second location, and a third location.

3. The method of claim 2, wherein the variable geometry mechanisms comprise a first set of variable guide vanes and a second set of variable guide vanes, and wherein the aerodynamic load modulation schedule assigns a first position to the first set of variable guide vanes and a second position to the second set of variable guide vanes.

4. The method of claim 3, wherein the aerodynamic load modulation schedule assigns the first set of variable guide vanes and the second set of variable guide vanes to an open position when the shaft shear location is the first location.

5. The method of claim 3, wherein the aerodynamic load modulation schedule assigns the first set of variable guide vanes to a closed position and the second set of variable guide vanes to an open position when the shaft shear location is the second location.

6. The method of claim 3, wherein the aerodynamic load modulation schedule assigns the first set of variable guide vanes and the second set of variable guide vanes to a closed position when the shaft shear location is the third location.

7. The method of claim 3, wherein the aerodynamic load modulation schedule assigns the first set of variable guide vanes and the second set of variable guide vanes to a closed position when the location of the failure event is the fuel control unit location.

8. The method of claim 1, wherein applying the aerodynamic load modulation schedule comprises applying a control signal to the variable geometry mechanisms to step change a position of the variable geometry mechanisms.

9. A system for operating a gas turbine engine having variable geometry mechanisms, the system comprising:
   a processing unit; and
   a non-transitory computer-readable medium having stored thereon program instructions executable by the processing unit for:
      detecting a failure event associated with the gas turbine engine;
      identifying a location of the failure event from one of a shaft shear location and a fuel control unit location;
      selecting an aerodynamic load modulation schedule for the variable geometry mechanisms of the gas turbine engine from a plurality of aerodynamic load modulation schedules as a function of the location of the failure event; and
      applying the aerodynamic load modulation schedule as selected to the variable geometry mechanisms during the failure event.

10. The system of claim 9, wherein selecting the shaft shear location comprises selecting one of a first location, a second location, and a third location.

11. The system of claim 10, wherein the variable geometry mechanisms comprise a first set of variable guide vanes and a second set of variable guide vanes, and wherein the aerodynamic load modulation schedule assigns a first position to the first set of variable guide vanes and a second position to the second set of variable guide vanes.

12. The system of claim 11, wherein the aerodynamic load modulation schedule assigns the first set of variable guide vanes and the second set of variable guide vanes to an open position when the shaft shear location is the first location.

13. The system of claim 11, wherein the aerodynamic load modulation schedule assigns the first set of variable guide vanes to a closed position and the second set of variable guide vanes to an open position when the shaft shear location is the second location.

14. The system of claim 11, wherein the aerodynamic load modulation schedule assigns the first set of variable guide vanes and the second set of variable guide vanes to a closed position when the shaft shear location is the third location.

15. The system of claim 11, wherein the aerodynamic load modulation schedule assigns the first set of variable guide vanes and the second set of variable guide vanes to a closed position when the location of the failure event is the fuel control unit location.

16. The system of claim 9, wherein applying the aerodynamic load modulation schedule comprises applying a control signal to the variable guide vanes to step change a position of the variable guide vanes.

17. A system comprising:
   a gas turbine engine having variable geometry mechanisms; and
   a control system operatively connected to the gas turbine engine and configured for:
      detecting a failure event associated with the gas turbine engine;
      identifying a location of the failure event from one of a shaft shear location and a fuel control unit location; and
      applying an aerodynamic load modulation schedule to the variable geometry mechanisms from a plurality of aerodynamic load modulation schedules during the failure event as a function of the location of the failure event.

18. The system of claim 17, wherein identifying the location of the failure event comprises determining a position of a shaft shear along at least one shaft of the gas turbine engine.

* * * * *